United States Patent
Chao et al.

(10) Patent No.: US 7,230,609 B2
(45) Date of Patent: Jun. 12, 2007

(54) TOUCH POSITION COORDINATE DETECTING SYSTEM

(75) Inventors: Zhong De Chao, Chengdu (CN); Ao Yong, Chengdu (CN); Deng Wei, Chengdu (CN)

(73) Assignee: GeneralTouch Technology Co., Ltd., Chengdu (CN)

( * ) Notice: Subject to any disclaimer, the term of this patent is extended or adjusted under 35 U.S.C. 154(b) by 585 days.

(21) Appl. No.: 10/866,944

(22) Filed: Jun. 14, 2004

(65) Prior Publication Data
US 2004/0263492 A1   Dec. 30, 2004

(30) Foreign Application Priority Data
Jun. 16, 2003   (CN) ................. 03 1 35201

(51) Int. Cl.
*G09G 5/00*   (2006.01)
(52) U.S. Cl. .......... 345/173; 345/177; 178/18.04
(58) Field of Classification Search .......... 345/156, 345/158, 173–178, 179; 178/18.01, 18.03, 178/18.04, 19.01, 19.02, 19.03
See application file for complete search history.

(56) References Cited

U.S. PATENT DOCUMENTS

| | | | | |
|---|---|---|---|---|
| 5,177,327 A | * | 1/1993 | Knowles | 178/18.04 |
| 6,087,599 A | * | 7/2000 | Knowles | 178/18.04 |
| 6,229,529 B1 | * | 5/2001 | Yano et al. | 345/175 |
| 6,630,929 B1 | * | 10/2003 | Adler et al. | 345/177 |
| 6,633,280 B1 | * | 10/2003 | Matsumoto et al. | 345/173 |
| 7,061,475 B2 | * | 6/2006 | Kent | 345/177 |

* cited by examiner

*Primary Examiner*—Richard Hjerpe
*Assistant Examiner*—Mansour M. Said
(74) *Attorney, Agent, or Firm*—Vinson & Elkins L.L.P.

(57) ABSTRACT

A touch position coordinate detecting system is provided that is based on surface acoustic waves and includes arrays of reflective patterns between a touch region of a touch panel. An initial burst that includes two frequency components is sent on the panel. The reflective arrays include two sub-arrays centered respectively at the two frequencies. A touch on the panel involves an absorption of the acoustic waves traveling in the region of the panel, and provides a localized damping in a time output signal. A time localized damping is detected for each reflected frequency components, thereby enhancing the signal-to-noise ratio of the system.

13 Claims, 7 Drawing Sheets

TOUCH POSITION COORDINATE DETECTING SYSTEM

BACKGROUND OF THE INVENTION

1. Field of the Invention

The invention relates to a touch position coordinate detecting system, using acoustic waves propagating on a touch panel.

2. Description of the Related Art

Touch position coordinate detecting systems are usually used, for example, in graphic display apparatuses, generally provided with a detecting system for determining the coordinates of a touch position along two predetermined axis X and Y, which are generally at right angles. A touch, causing an acoustic attenuation, is generally realized by the application on the panel of a finger tip of a user, or alternatively of a stylus (referenced ST on FIG. 1) adapted for absorbing acoustic wave energy and manipulated by the user, thus selecting a displayed menu or command. The detection of the position of the touch along the coordinates enables the system to determine the choice of the user and possibly the next graphic to be displayed. Such a touch position coordinate detecting system is, for example, disclosed in European Patent No.: EP 0190734.

Figure 1:
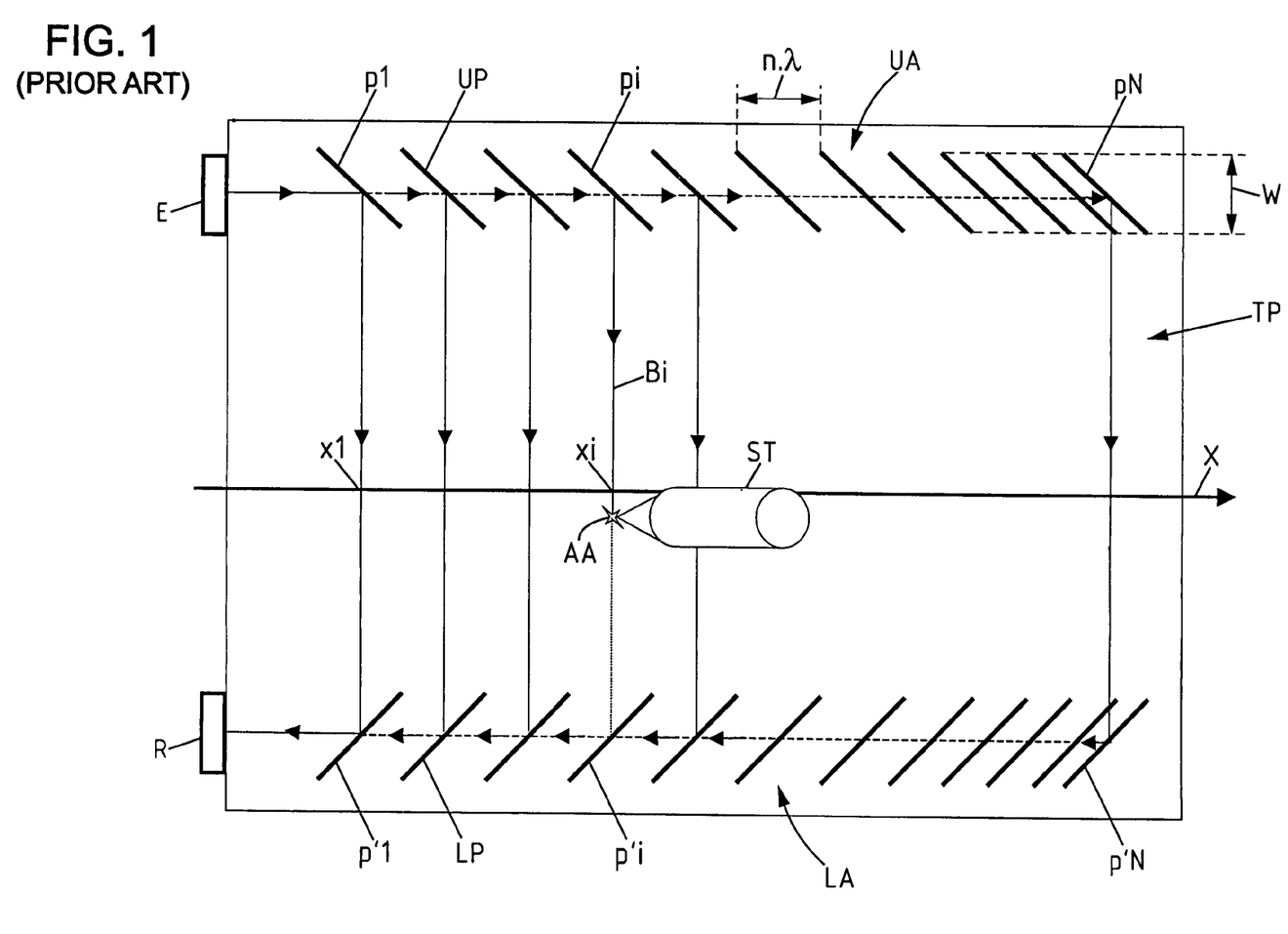
FIG. 1 illustrates a prior art touch panel.

Referring to the prior art system shown in FIG. 1, an input transducer E launches on the touch panel TP an initial burst of acoustic waves having the same acoustic frequency F. The resulting acoustic beam travels along the X-axis and reaches an upper array UA of parallel reflective patterns. Each pattern is preferably angled at 45° with respect to the X-axis, and it reflects a portion of the initial acoustic beam amplitude towards an output transducer R, preferably via a lower reflective array LA, symmetrical to the upper array relative to the X-axis as shown in FIG. 1. Therefore, each acoustic path resulting from the double reflection on the two respective patterns UP and LP of the upper and lower reflective arrays is U-shaped. More particularly, the length of the U legs increases with the X coordinate of the reflective patterns. The output transducer receives the reflective portions of the acoustic beam with a delay between the successive portions, due to the travel time of the acoustic waves between two successive patterns.

Figure 2:
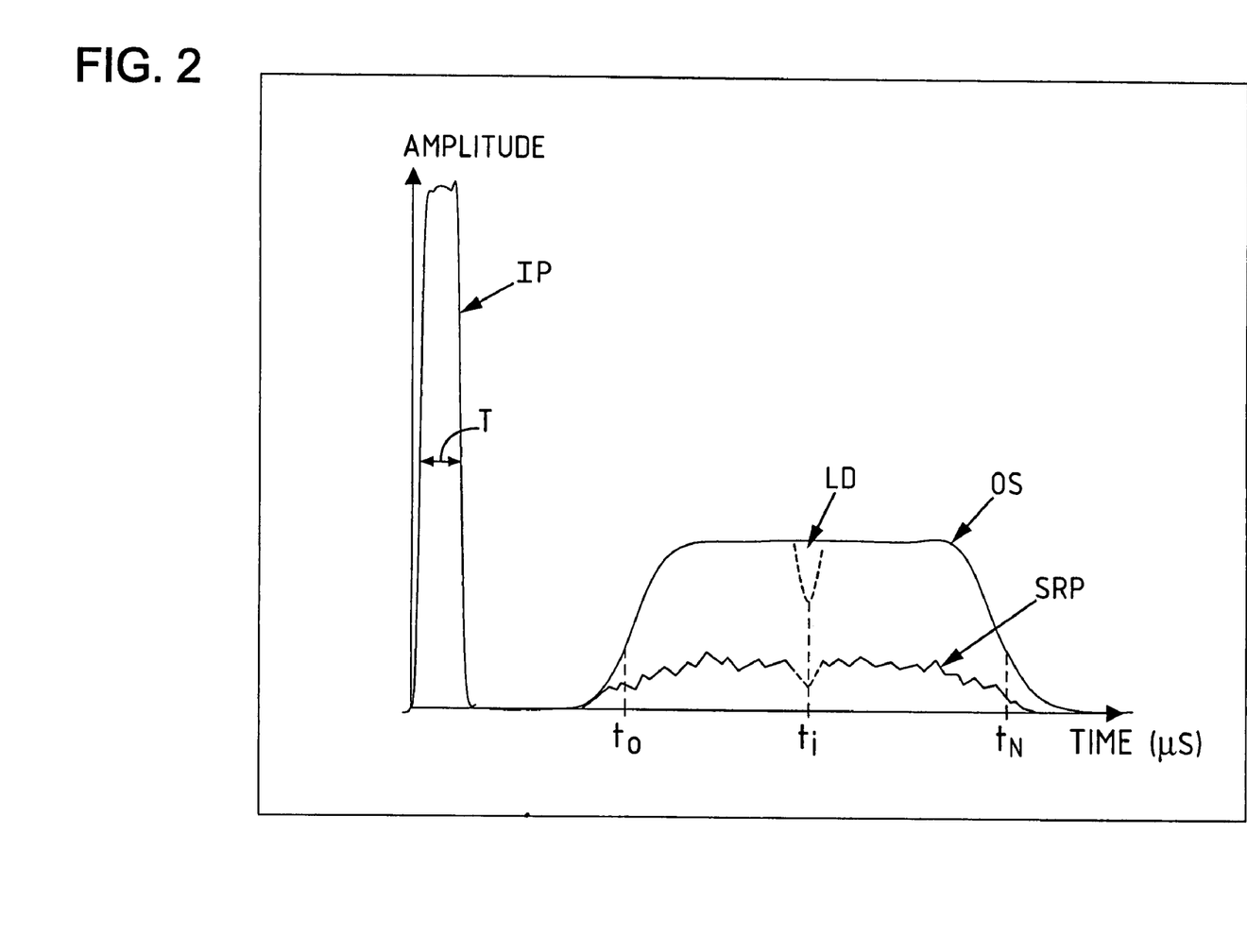
FIG. 2 illustrates input IP and output OS time signals of prior art.

Referring to FIG. 2, a time signal OS is developed from the output signal of the output transducer R. The initial transmitted burst IP has a finite duration T. The time abscissa t0 corresponds to the reception date of the shorter U legs acoustic beam (reflected by the first patterns p1 and p'1 of FIG. 1) and $t_N$ corresponds to the reception date of the longer U legs acoustic beam (reflected by the last patterns pN and p'N of FIG. 1). When a touch (or a stylus ST) is applied on the panel surface TP, an attenuation of the acoustic waves occurs in the region AA of the touch, resulting from an absorption phenomenon. More particularly, the touch partially absorbs the beam Bi reflected by the pattern pi having the coordinate xi. Therefore, a localized damping LD appears on the time signal of FIG. 2 at the time abscissa ti (see the dashed line of FIG. 2). The coordinate xi of the touch is determined from the time abscissa ti, using for example a formula of the type xi=C/2(ti−t0)+x1, where x1 is the X-coordinate of the first pattern p1 and C is the velocity of the acoustic waves.

Of course, for determining also the Y-coordinate of a touch, a further pair of arrays can be provided along the Y-axis, for example at the right edge and at the left edge of the panel as shown in FIG. 1.

As indicated above, the acoustic waves have the same frequency F, imposing a spacing value nλ between two successive patterns of an array, corresponding to an integral multiple of a wavelength at the frequency F. Moreover, as the acoustic waves are naturally attenuated during their travel, increasing the reflectivity of the arrays far from the transducers makes it possible to flatten the amplitude of the output time signal, thereby enhancing the signal-to-noise ratio for the higher X-coordinates. Therefore, the number of reflective patterns increases from an end of the array, near to the transducers, to the other end of the array, far from the transducers (e.g. the spacing between the reflective patterns and the integer n decreases when moving away from the transducers).

Another prior art document, U.S. Pat. No. 4,645,870, discloses a touch position coordinate detecting system, wherein the determination of a touch position is not realized from a time localized damping in the time output signal, but rather from a frequency damping in a frequency related output signal. The initial burst signal is composed of a number of frequency components f1, f2, . . . , fn, and the spacing between the successive patterns of the array is a function of the corresponding wavelengths λ1, λ2, . . . , λn, so that the array acts as a dispersive line and the frequencies f1, . . . , fn are spread and separated in the frequency related output signal. More details on the phenomena involved in the reflection of this type of array can be found in prior art documents relating to acoustic wave pulse compression filters, such as the document "The IMCON Pulse Compression Filter and its Applications", by Tom A. Martin, IEEE Transactions on Microwave Theory and Techniques, Vol-MTT-21, No. 4, April 1973, pp. 186-194.

More particularly, in U.S. Pat. No. 4,645,870, the successive spacing between the reflective patterns varies along the X-axis from λ1 to λn. The position of each pattern in the array has to be very precise for enabling an appropriate spreading of the frequencies. Moreover, the thickness of each reflective pattern has to be very precise as well. Generally, the patterns are made of grooves formed in the edges of the panel, by an etching process. Therefore, the technique of touch position detection based on frequency measurements is not really compatible with a manufacturing process in series with the touch panels.

More generally, the input transducer periodically launches a burst of acoustic waves, for example every 0.5 millisecond. If the user does not touch the panel, the bursts are launched uselessly. It is well known that such touch position detecting systems are very energy consuming. The problem becomes crucial when such touch position detecting systems are provided on self-service terminals in public places, for example, in airports or train stations.

Moreover, returning again to European Patent No.: EP 0190734, in order to ensure a reliable detection with respect to the signal-to-noise ratio, the duration value T of each initial burst of acoustic waves has to be greater than W/C, in particular for 15" panels, where W is the width of the reflective arrays, measured perpendicularly to the X-axis, and C is the velocity of propagation of the acoustic waves. In the embodiment described in the specification of the aforementioned European patent, the lower limit value of the duration T is 4 microseconds for obtaining a satisfactory signal-to-noise ratio of the output time signal. If such a burst has to be launched every 0.5 millisecond, the system consumes a huge amount of energy.

It is an object of the present invention to provide a touch position coordinate detecting system that alleviates the drawbacks of the prior art systems. More particularly, it is an object of the present invention is to provide a touch position coordinate detecting system having an improved accuracy in touch position detection.

Another object of the present invention is to provide a touch position coordinate detecting system that consumes a relatively small amount of energy while still providing satisfactory accuracy.

It is yet another object of the present invention to provide a touch position coordinate detecting system that can be manufactured easily in series.

Because the touch position detection of the present invention uses at least two frequency components in the received output signal, with regard to the system disclosed in European Patent No.: EP 0190734, the minimal threshold value for the duration T of the launched bursts according to the present invention can advantageously be divided in two, and, therefore, the corresponding energy consumption can be reduced accordingly.

Moreover, the touch position coordinate detecting system of the present invention does not require as precise a manufacture as needed by the system disclosed in U.S. Pat. No. 4,645,870, since the first and second interspersed sub-arrays can operate respectively at first and second frequencies in an overall stable way.

SUMMARY OF THE INVENTION

In one embodiment of the present invention a touch position coordinate detecting system is provided that is based on surface acoustic waves and includes arrays of reflective patterns between a touch region of a touch panel. An initial burst that includes two frequency components is sent on the panel. The reflective arrays include two sub-arrays centered respectively at the two frequencies. A touch on the panel involves an absorption of the acoustic waves traveling in the region of the panel, and provides a localized damping in a time output signal. A time localized damping is detected for each reflected frequency components, thereby enhancing the signal-to-noise ratio of the system.

BRIEF DESCRIPTION OF THE DRAWINGS

Further features and advantages of the invention will be understood by reference to the following description and the accompanying drawings in which.

DETAILED DESCRIPTION OF SPECIFIC EMBODIMENTS

Figure 3:
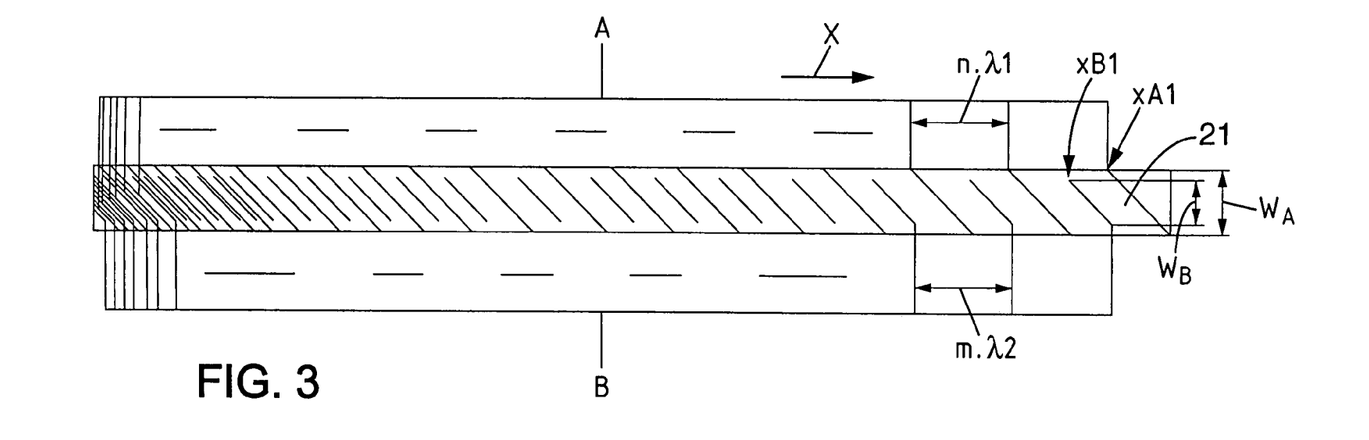
FIG. 3 illustrates a dual reflective array in one embodiment of the present invention.

Further to the description above of the prior art with reference to FIGS. 1 and 2, the description of an embodiment according to the invention is given hereafter with reference to FIG. 3.

In the example of FIG. 3, the array 21 comprises first A and second B interspersed sub-arrays. The array may comprise more than two interspersed sub-arrays if a higher precision of detection is required and/or if a lower amount of consumed energy is required. The spacing $n.\lambda 1$ between two consecutive patterns of the first sub-array A, taken along the X-axis, substantially equals an integral multiple of a wavelength at a first acoustic frequency f1. Moreover, the spacing $m.\lambda 2$ between two consecutive patterns of the second sub-array B, taken along the X-axis, substantially equals an integral multiple of a wavelength at a second acoustic frequency f2. Therefore, the first and second sub-arrays are adapted for reflecting respectively at least a substantial part of a first frequency f1 component and at least a substantial part of a second frequency f2 component of a launched burst of acoustic waves that would have at least these two frequencies f1 and f2. It should be noted that in U.S. Pat. No. 4,645,870, the spacing between the patterns progressively varies with a varying increment $\lambda 1, \lambda 2, \ldots, \lambda n$. In the array of the present invention, as the two sub-arrays are interspersed, the spacing P is, as a rule of thumb, determined by:

$$P=|xA1-xB1+n.\lambda 1-m.\lambda 2|, \text{ where:}$$

xA1 is the X-coordinate of the first pattern of the sub-array A, xB1 is the X-coordinate of the first pattern of the sub-array B, the integers n and m are equal or close.

In the embodiment of FIG. 3, the sub-arrays A and B are of different widths $W_A$ and $W_B$ (measured perpendicularly to the X-axis), and more particularly $W_A > W_B$. This may be useful if frequencies f1 and f2 are such that the f1 frequency component is more attenuated during its propagation on the panel than the f2 frequency component. Alternatively, if frequencies f1 and f2 are close, the sub-arrays A and B may have preferably substantially the same width, as shown on FIG. 4.

Figure 5:
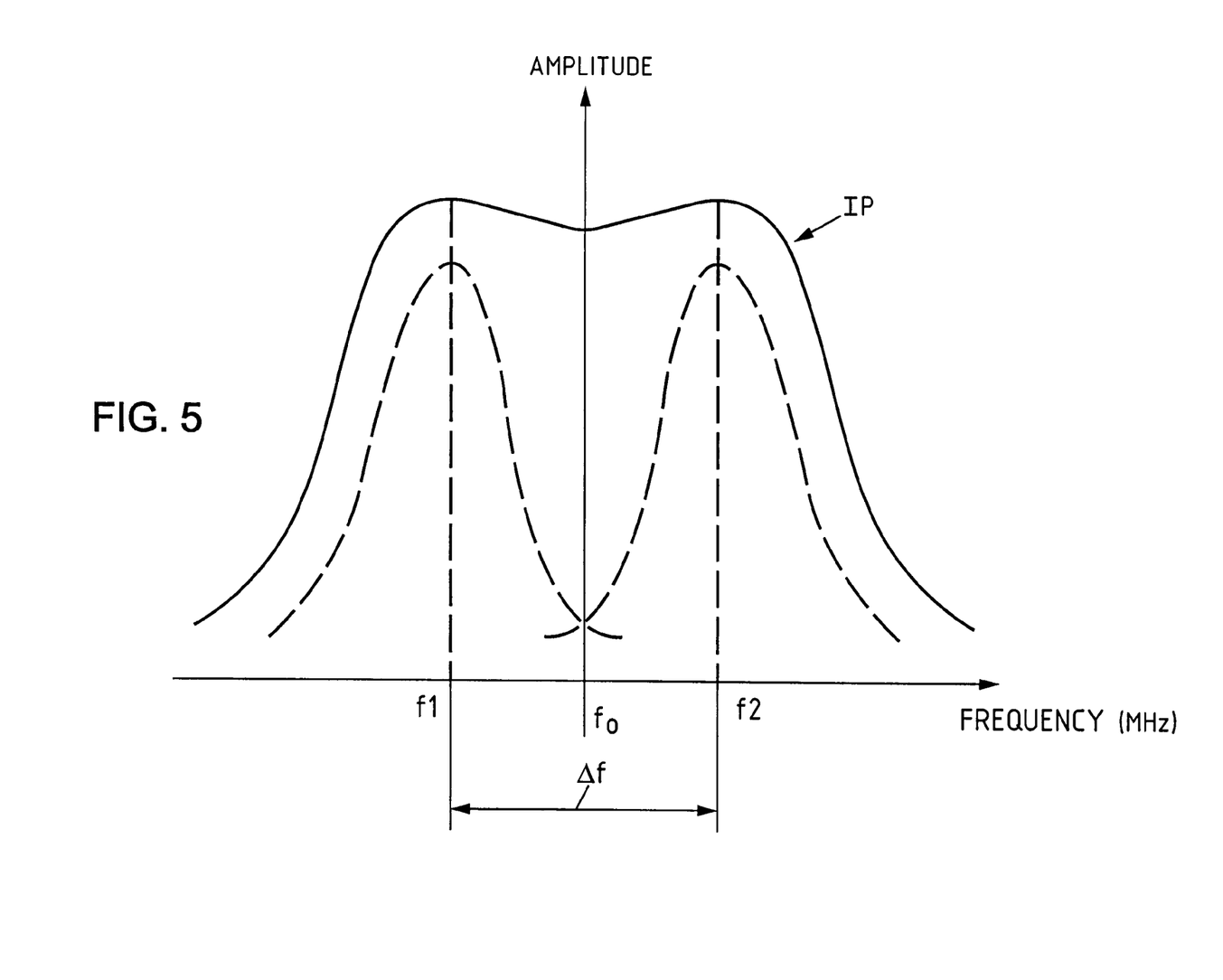
FIG. 5 illustrates the frequency response of an input burst according to the invention.

Now referring to FIG. 5, each input burst IP according to the invention (see the solid line) comprises two frequency components f1 and f2 (see the dashed lines), around a centre frequency f0, so that $f1=f0-\Delta f/2$ and $f2=f0+\Delta f/2$, where $\Delta f$ is the frequency bandwidth of the input bursts. The bursts may comprise more than two frequency components if the array has more than two interspersed sub-arrays, for the reasons explained above.

It should be noted that the output signal OS, received by the receiving transducers in the panel of the invention, also has substantially the same frequency bandwidth $\Delta f$ centered at the frequency F0, and therefore has substantially the same frequency response as shown on FIG. 5.

Figure 6:
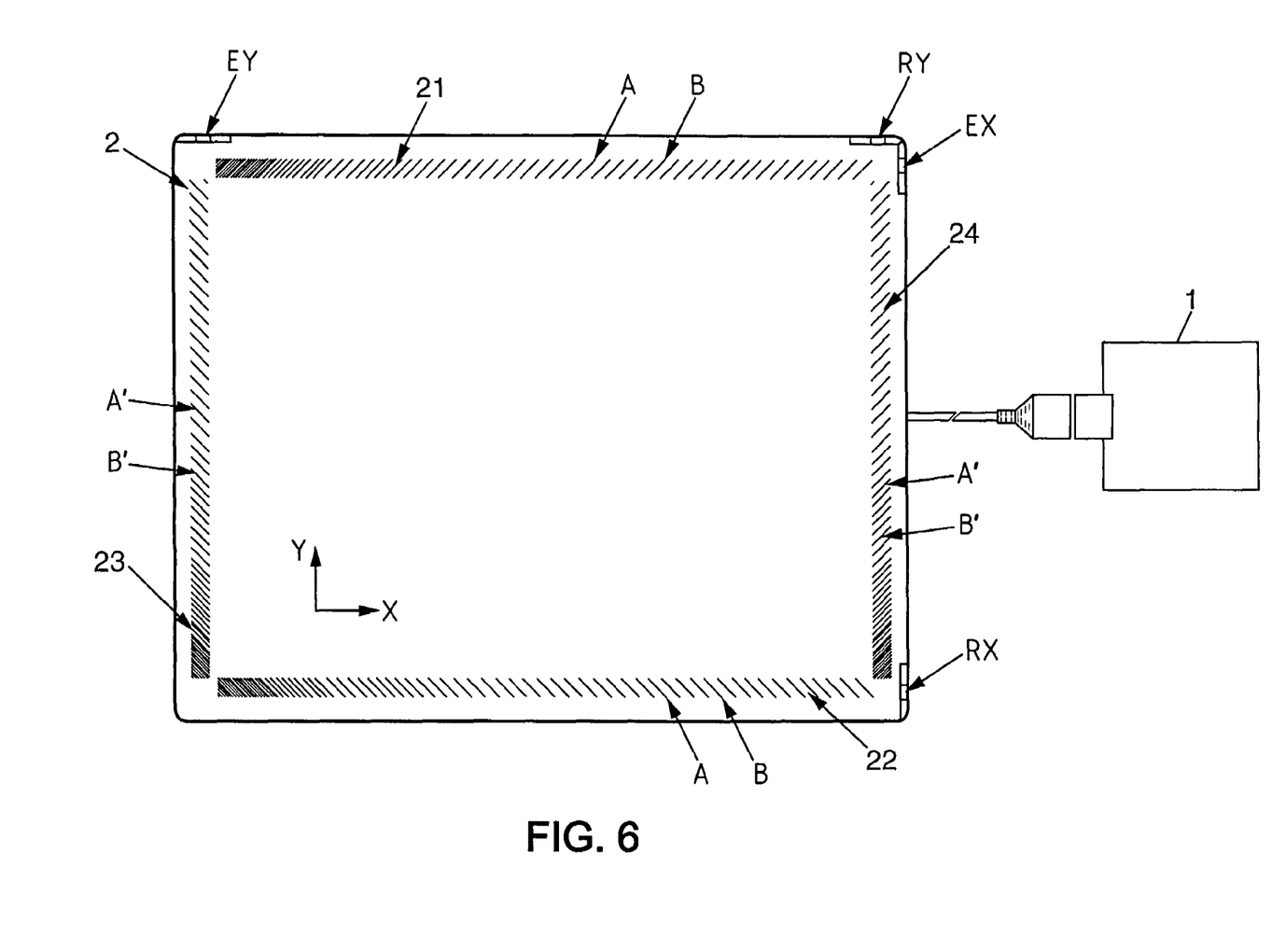
FIG. 6 is an overall view of the system according to the invention.

Referring now to FIG. 6, the overall system comprises a touch panel 2 connected to a controller 1. The transducers coupled to the panel and referenced EX, EY, RX, RY are electro-acoustic transducers capable of converting an electric signal into acoustic waves, or, reversely, of converting acoustic waves into an electric signal. The transmitting transducers EX and EY are fed with an input signal provided by the controller 1 and send bursts of acoustic waves on the panel 2. Preferably, the acoustic waves propagating on the panel 2 are surface acoustic waves (or "Rayleigh waves"). For example, the value of the acoustic wave velocity C is 3200 m/s, the centre frequency value f0 is 5.5 MHz and the frequency bandwidth Δf value is less or equal to 1 MHz. The receiving transducers RX and RY receive the reflected portions of the initial bursts and deliver an electric output signal to the controller 1. Each transducer EX, EY, RX, RY has a frequency response bandwidth wider than Δf, or at least equal to Δf.

More particularly, the transducer EX transmits the initial bursts towards the upper array 21 which reflects the bursts (or "amplitude portions" of the bursts) towards the lower array 22, for the determination of the X-coordinates. The lower array 22 reflects back the portions of the bursts towards output transducer RX, which delivers an output time signal to the controller 1. The transducer EY transmits the initial bursts towards the left side array 23 which reflects the bursts (or "portions" of the bursts) towards the right side array 24, for the determination of the Y-coordinates. The right side array 24 reflects back the portions of the bursts towards the output transducer RY which delivers an output time signal to the controller 1.

Figure 4:
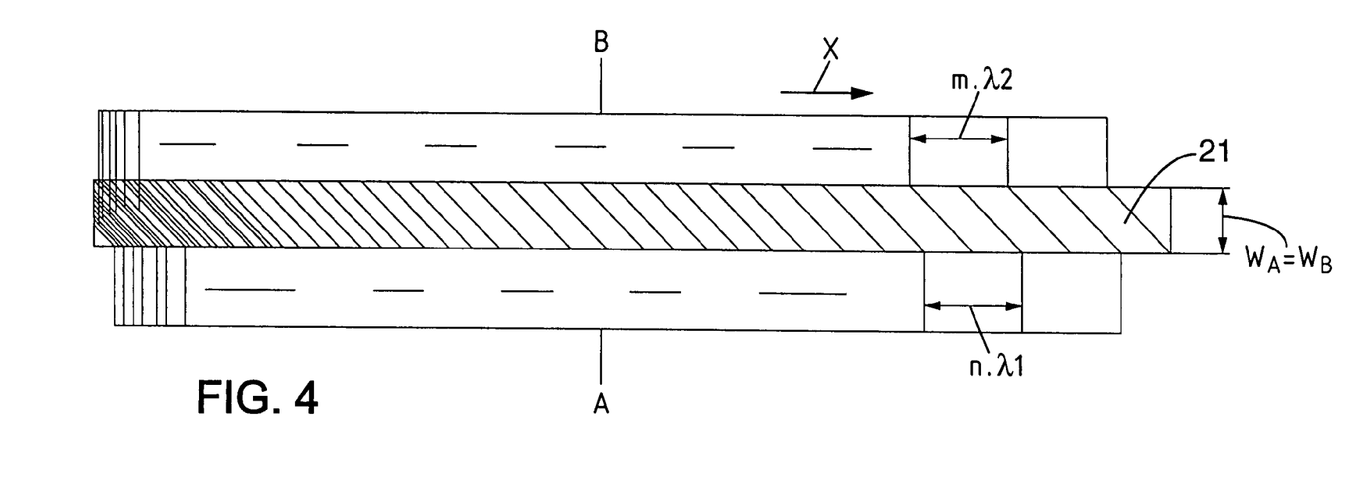
FIG. 4 illustrates a dual reflective array in another embodiment of the present invention.

The upper array 21 comprises two sub-arrays A and B of FIG. 3 or FIG. 4. Preferably, the lower array 22 also comprises the same sub-arrays A and B. Preferably, the left side array 23 and the right side array 24 are also dual reflective arrays comprising two sub-arrays A' and B'. It should be noted that the input signal for the Y-coordinate detection (particularly the bandwidth Δf of this signal) may be different from the input signal of the X-coordinate detection. Therefore, the spacing between the patterns of the sub-arrays A' and B' may be different from the spacing between the patterns of the sub-arrays A and B.

The patterns formed on the panel 2 and constituting the arrays 21, 22, 23, and 24 are made of a deposited reflective material which is raised relatively to the touch panel surface or can either be made of depressed grooves for example by the use of an etching process. Preferably, the patterns formed on the panel 2 are made of a screen printed reflective material. For example, such an acoustic reflective material is a silver ink which is deposited on the panel and dried thereon. Therefore, the panel according to the invention can be manufactured easily in series. Preferably, the spacing between the successive patterns of an array decreases progressively from an end of the array, near to the transmitting transducers, to the opposite end of the array, far from the transmitting transducers, as shown on FIG. 6. As explained above, this configuration enables the output signals to be substantially flat, for obtaining a satisfactory signal-to-noise ratio in the late part of the received time signals.

Figure 7:
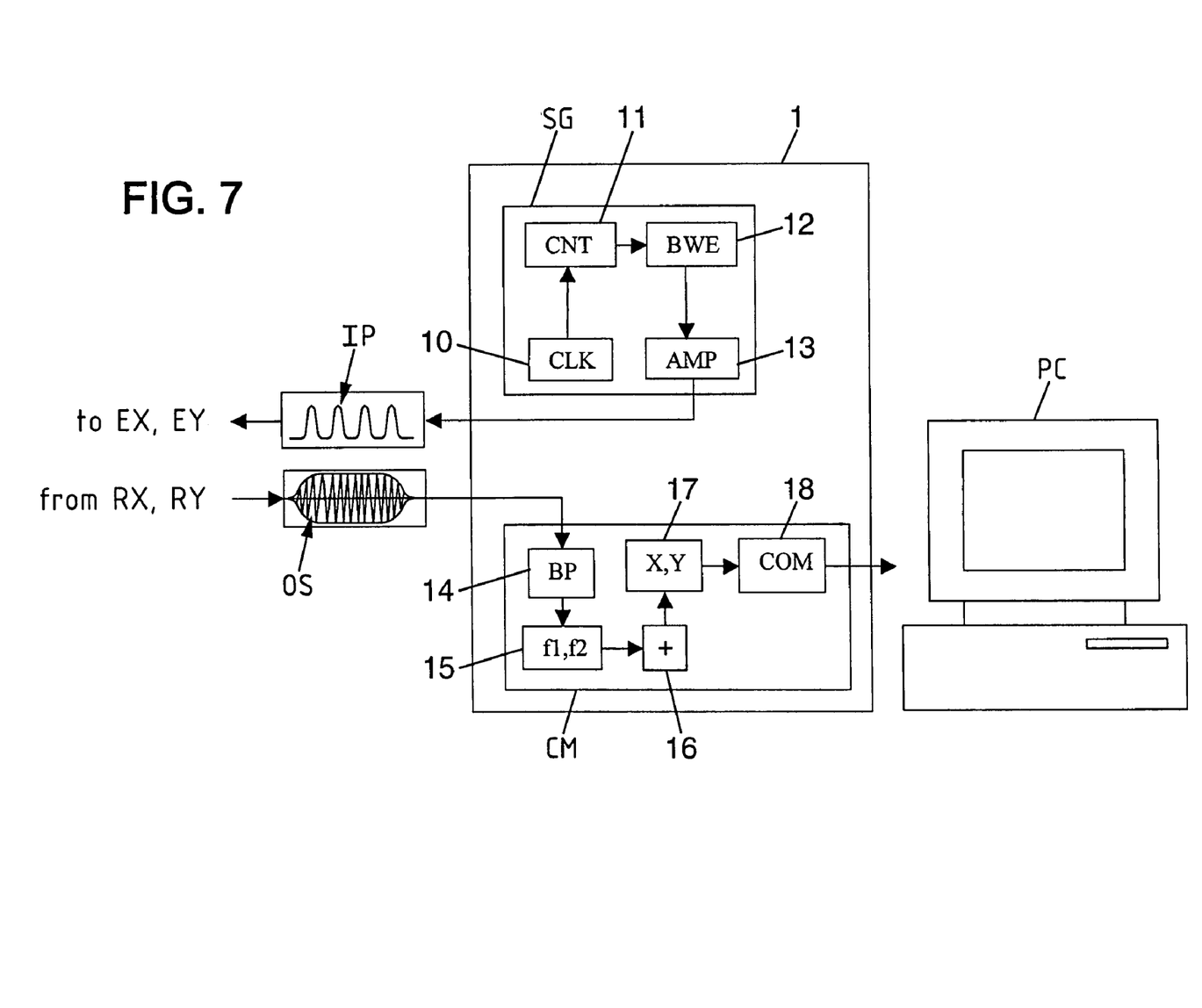
FIG. 7 illustrates schematically the controller of the system of FIG. 6.

Now referring to FIG. 7, the controller 1 comprises an input signal generating unit SG and an output signal processing unit CM. The signal generating unit SG preferably comprises a clock oscillator 10 coupled to a counter 11 for generating an input pulse of duration T and having a frequency f0. A bandwidth expander 12 is fed with the input pulse so that the frequency of the input pulse is extended from f1 to f2 (e.g. from f0−Δf/2 to f0+Δf/2). An amplifier 13 amplifies the amplitude of the input pulse IP which then feeds the transmitting transducers EX and/or EY. The corresponding burst, launched by a transmitting transducer (EX and/or EY), has thus substantially the same duration T and the same bandwidth Δf as the input pulse IP.

The output signal processing unit CM receives from the receiving transducers RX and/or RY an output time signal OS of the type as shown on the right part of FIG. 2, but having the two frequency components f1 and f2. Advantageously, the output signal is enhanced preferably by a bi-stable resonator 14 arranged for operating at frequencies f1 and f2, in order to select in the output signal a frequency bandwidth Δf substantially extending between frequencies f1 and f2. A preferred embodiment of the bi-stable resonator 14 is shown on FIG. 8 and described hereafter. Alternatively, signal enhancing means comprising a band pass filter centered at f0 and having a frequency bandwidth Δf, coupled to an amplifier, can also be provided.

The enhanced output signal is applied to demodulating means 15, operating at carrier frequencies f1 and f2. The demodulated signals are preferably converted into digital signals and summed by summing circuit 16. The resulting digital time signal is applied to a comparing unit 17 arranged for detecting a damping in the digital level of the time signal, for example below a predetermined threshold, and determining thereby the X-Y coordinates of a touch position. According to the detected X-Y coordinates, a module 18 forms a corresponding command intended for the microcomputer PC. Alternatively, the module 18 may be implanted in a chipset of the microcomputer PC.

Figure 8:
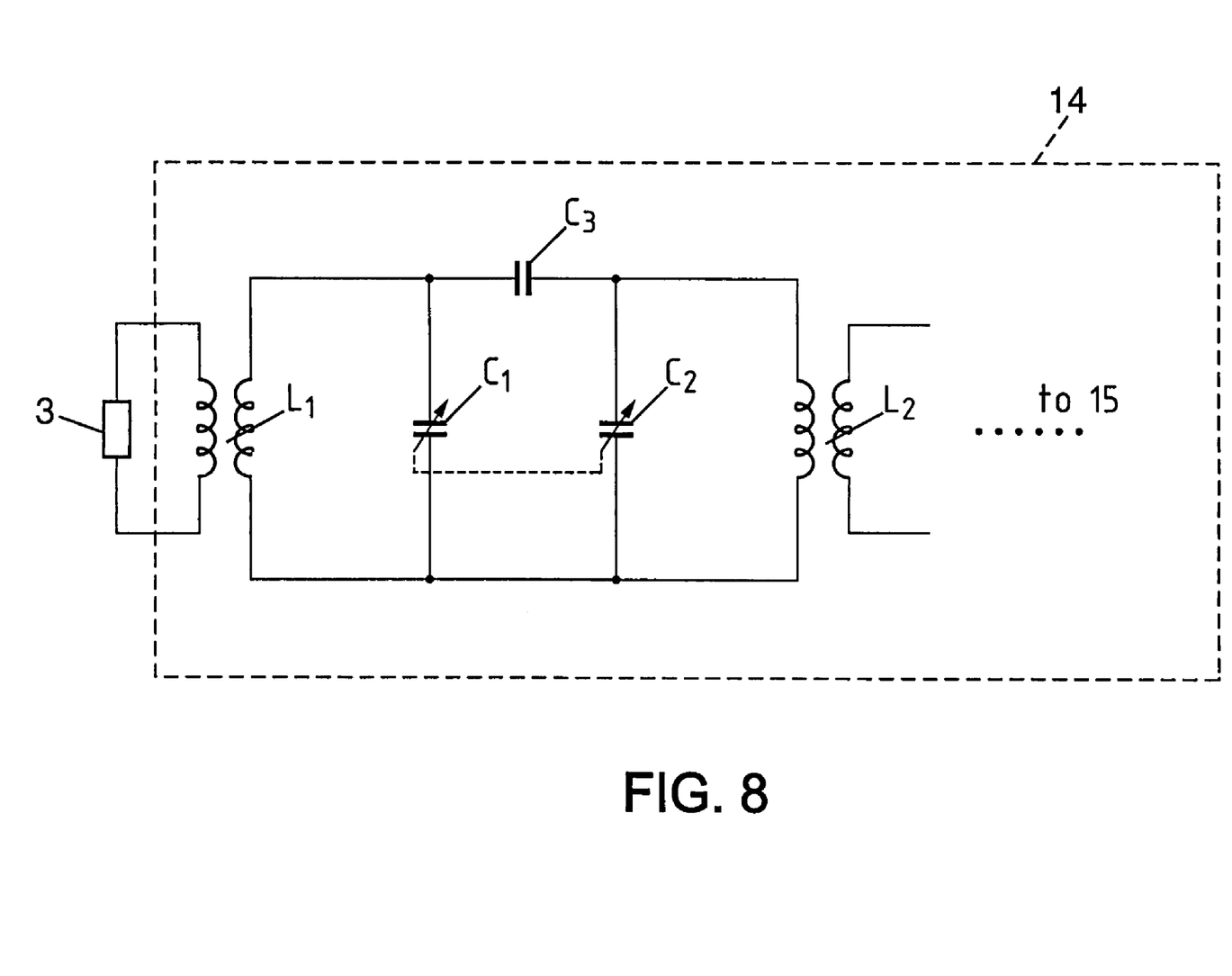
FIG. 8 illustrates schematically the bi-stable resonator of the controller as shown in FIG. 7.

In the example shown on FIG. 8, the bi-stable resonator 14 comprises a first inductance L1 connected to a receiving transducer 3 (e.g. RX of RY), and a first capacitance C1 which is adjustable so that the first circuit L1, C1 resonates at the frequency f1. The first resonating circuit L1, C1 is coupled by a coupling capacitance C3 to a second resonating circuit L2, C2 comprising an inductance L2 and capacitance C2 which is adjustable so that the second resonating circuit resonates at the frequency f2.

With the use of such a "dual frequency" system, the signal-to-noise ratio is substantially increased. By the same token, the duration T of the transmitted bursts can be reduced, nearly by a factor two, while having still a satisfactory signal-to-noise ratio. A preferred burst duration value T is in the range of 0.5 Wmax/C to 4 Wmax/C, where Wmax is the width value of the larger one among the first and the second sub-arrays (e.g. the width WA on FIG. 3) and C is the velocity of propagation of the acoustic waves on the panel. For a 15" panel or a 17" panel, the duration T is more preferably in the range of 0.5 Wmax/C to Wmax/C (e.g. from around 1.5 μs to 3 μs with a width value Wmax around 0.01 m).

In a single frequency system such as the one disclosed in European Patent No.: EP 0190734, a duration T below the optimum value W/C would lead to an output time signal SRP (as shown on FIG. 2) having a low signal-to-noise ratio and whose reliability and touch resolution is poor. Advantageously, the detection according to the present invention, based on two frequency components, enables a reduction of the amplitude fluctuations due to noise.

What is claimed:

1. A touch position coordinate detecting system, comprising:
   a transmitting transducer operable for launching an initial burst of acoustic waves on a panel, wherein the initial burst includes at least a first and a second frequency component;
   at least one array of reflective patterns, each pattern being arranged on the panel for reflecting an amplitude portion of the initial burst of acoustic waves, the array extending substantially along a predetermined axis, wherein the array includes at least a first and second interspersed sub-array, the first and second sub-arrays being adapted for reflecting at least a portion of the first and second frequency components, respectively;

a receiving transducer operable for successively receiving the reflected portions of the initial burst of acoustic waves from the array of reflective patterns, wherein the received reflected portions include a delay due to the travel of the acoustic waves between the successive patterns, thereby delivering a time output signal;

an output signal processing unit operable for detecting a time localized damping in the amplitude of the reflected first and second frequency components caused by a touch on the panel that produces an acoustic attenuation of at least one reflected portion, wherein the acoustic attenuation is useful for determining at least one coordinate position of the touch along the predetermined axis.

2. The system as described in claim 1, wherein the output signal processing unit includes a demodulator operating at each of the first and second frequencies and a summing circuit for summing the resulting demodulated signals.

3. The system as described in claim 2, wherein the output signal processing unit includes a signal enhancer that is cooperatively operable with the demodulator and the summing circuit for selecting from the output signal a frequency bandwidth that extends substantially between the first and second frequencies.

4. The system as described in claim 3, wherein the signal enhancer includes a bi-stable resonator operable at the first and second frequencies.

5. The system as described in claim 1, wherein the initial burst of acoustic waves has a duration in the range of $0.5 W_{max}/C$ to $4 W_{max}/C$, where C is the velocity of propagation of the acoustic waves on the panel, and $W_{max}$ is the width of the larger one among the first and second sub-arrays, wherein the width is measured perpendicularly to the predetermined axis.

6. The system as described in claim 5, wherein the duration of the initial burst of acoustic waves is in the range of $0.5 W_{max}/C$ to $W_{max}/C$.

7. The system as described in claim 1, wherein
the first sub-array includes a spacing between two consecutive patterns, and if measured along the predetermined axis, the spacing is substantially equal to an integral multiple of a wavelength of the initial burst of acoustic waves taken at the first frequency, and
the second sub-array includes a spacing between two consecutive patterns, and if measured along the predetermined axis, the spacing is substantially equal to an integral multiple of a wavelength of the initial burst of acoustic waves taken at the second frequency.

8. The system as described in claim 7, wherein the array includes a spacing between successive reflective patterns of the first and second sub-arrays, and the spacing decreases progressively from an end of the array proximate the transmitting transducer to the opposite end of the array.

9. The system as described in claim 1, wherein the first and second sub-arrays have a first width and a second width, respectively, that is measured perpendicularly to the predetermined axis and the first width is substantially equal to the second width.

10. The system as described in claim 1, wherein the first and second sub-arrays have a first width and a second width, respectively, that is measured perpendicularly to the predetermined and the first width is different from the second width.

11. The system as described in claim 1, wherein the array of reflective patterns are made of a screen printed reflective material.

12. The system as described in claim 1, wherein the array of reflective patterns are made of grooves etched on a surface of the panel.

13. A touch position coordinate detecting system, comprising:
means for launching an initial burst of acoustic waves on a panel, wherein the initial burst includes at least a first and a second frequency component;
at least one array of reflective patterns, each pattern being arranged on the panel for reflecting an amplitude portion of the initial burst of acoustic waves, the array extending substantially along a predetermined axis, wherein the array includes at least a first and second interspersed sub-array, the first and second sub-arrays being adapted for reflecting at least a portion of the first and second frequency components, respectively;
means for successively receiving the reflected portions of the initial burst of acoustic waves from the array of reflective patterns, wherein the received reflected portions include a delay due to the travel of the acoustic waves between the successive patterns, thereby delivering a time output signal;
means for detecting a time localized damping in the amplitude of the reflected first and second frequency components caused by a touch on the panel that produces an acoustic attenuation of at least one reflected portion, wherein the acoustic attenuation is useful for determining at least one coordinate position of the touch along the predetermined axis.

* * * * *

UNITED STATES PATENT AND TRADEMARK OFFICE
CERTIFICATE OF CORRECTION

| | |
|---|---|
| PATENT NO. | : 7,230,609 B2 |
| APPLICATION NO. | : 10/866944 |
| DATED | : June 12, 2007 |
| INVENTOR(S) | : Chao et al. |

Page 1 of 1

It is certified that error appears in the above-identified patent and that said Letters Patent is hereby corrected as shown below:

In column 5, line 15, following the word "towards" insert the word --the--.

In column 5, line 18, following the word "or" insert the word --amplitude--.

Signed and Sealed this

Seventh Day of July, 2009

JOHN DOLL
*Acting Director of the United States Patent and Trademark Office*